United States Patent
Toji et al.

(10) Patent No.: US 11,326,238 B2
(45) Date of Patent: May 10, 2022

(54) STEEL MATERIAL FOR HIGH HEAT INPUT WELDING

(71) Applicant: JFE Steel Corporation, Tokyo (JP)

(72) Inventors: Yuki Toji, Tokyo (JP); Akio Ohmori, Tokyo (JP); Koichi Nakashima, Tokyo (JP); Ryo Arao, Tokyo (JP); Katsuyuki Ichimiya, Tokyo (JP); Kazukuni Hase, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 700 days.

(21) Appl. No.: 16/074,184

(22) PCT Filed: Jan. 30, 2017

(86) PCT No.: PCT/JP2017/003080
§ 371 (c)(1),
(2) Date: Jul. 31, 2018

(87) PCT Pub. No.: WO2017/135179
PCT Pub. Date: Aug. 10, 2017

(65) Prior Publication Data
US 2021/0140023 A1    May 13, 2021

(30) Foreign Application Priority Data
Feb. 3, 2016  (JP) .............................. JP2016-018572

(51) Int. Cl.
| *C22C 38/54* | (2006.01) |
| *B23K 35/30* | (2006.01) |
| *C22C 38/00* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *B23K 103/04* | (2006.01) |

(52) U.S. Cl.
CPC .......... *C22C 38/54* (2013.01); *B23K 35/3073* (2013.01); *C22C 38/001* (2013.01); *C22C 38/002* (2013.01); *C22C 38/005* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *B23K 2103/04* (2018.08)

(58) Field of Classification Search
CPC ..... C22C 38/54; C22C 38/001; C22C 38/002; C22C 38/005; C22C 38/04; C22C 38/06; C22C 38/42; C22C 38/48; C22C 38/50; B23K 35/3073; B23K 2103/04
See application file for complete search history.

(56) References Cited

U.S. PATENT DOCUMENTS

| 2007/0205001 A1 | 9/2007 | Shuster et al. |
| 2007/0269335 A1 | 11/2007 | Usami et al. |
| 2008/0247900 A1 | 10/2008 | Hayashi et al. |
| 2009/0025835 A1 | 1/2009 | Hara et al. |
| 2012/0291907 A1 | 11/2012 | Fujishiro et al. |

FOREIGN PATENT DOCUMENTS

| CN | 1396294 A | 2/2003 |
| CN | 1427087 A | 7/2003 |
| CN | 101289728 B | 5/2010 |
| EP | 1264902 A2 | 12/2002 |
| EP | 1533392 A1 | 5/2005 |
| EP | 2006407 A1 | 12/2008 |
| EP | 3034643 A1 | 6/2016 |
| JP | 5751243 A | 3/1982 |
| JP | 093597 A | 1/1997 |
| JP | 2002256379 A * | 9/2002 |
| JP | 3546308 B2 | 7/2004 |
| JP | 2004315925 A | 11/2004 |
| JP | 2004360074 A | 12/2004 |
| JP | 2006045586 A | 2/2006 |
| JP | 2009001909 A | 1/2009 |

(Continued)

OTHER PUBLICATIONS

International Search Report and Written Opinion for International Application No. PCT/JP2017/003080, dated May 9, 2017—7 pages.
Chinese Office Action for Chinese Application No. 201780009562.4, dated Sep. 25, 2019 with Concise Statement of Relevance of Office Action, 10 pages.
Chinese Office Action for Chinese Application No. 201780009562.4, dated May 28, 2020 with Concise Statement of Relevance of Office Action, 8 pages.
Extended European Search Report for European Application No. 17747336.0, dated Dec. 14, 2018, 8 pages.
Japanese Office Action for Japanese Application No. 2017-565525, dated Mar. 26, 2019 with Concise Statement of Relevance of Office Action, 8 pages.

(Continued)

*Primary Examiner* — Christopher S Kessler
*Assistant Examiner* — Andrew M Cheung
(74) *Attorney, Agent, or Firm* — RatnerPrestia

(57) ABSTRACT

Provided is a steel material for high heat input welding having excellent welding heat affected zone low-temperature toughness at −55° C. in the case that the steel material is welded by high heat input welding with a heat input of more than 80 kJ/cm. The steel material may be used in low-temperature storage tanks, for example. The steel material for high heat input welding includes, in mass %, C: 0.04 to 0.09%, Si: 0.15 to 0.25%, Mn: 1.40 to 2.00%, P: 0.015% or less, S: 0.0005 to 0.0040%, Al: 0.030 to 0.080%, Ti: 0.005 to 0.025%, B: 0.0003 to 0.0020%, Ca: 0.0005 to 0.0030%, N: 0.0030 to 0.0060%, O: 0.0040% or less, Nb: 0.005% or less, and Mo: 0.005% or less, the balance being Fe and incidental impurities.

8 Claims, No Drawings

(56) References Cited

FOREIGN PATENT DOCUMENTS

| | | | | | |
|---|---|---|---|---|---|
| JP | 4261765 | B2 | | 4/2009 | |
| JP | 2009235514 | A | | 10/2009 | |
| JP | 2009235514 | A | * | 10/2009 | |
| JP | 2010047805 | A | * | 3/2010 | |
| JP | 2010047805 | A | | 3/2010 | |
| JP | 2010111924 | A | | 5/2010 | |
| JP | 2010174314 | A | | 8/2010 | |
| JP | 4637516 | B2 | | 2/2011 | |
| JP | 2011074443 | A | | 4/2011 | |
| JP | 2011214053 | A | * | 10/2011 | |
| JP | 2011214053 | A | | 10/2011 | |
| JP | 2013147741 | A | | 8/2013 | |
| WO | 2015022899 | A1 | | 2/2015 | |
| WO | WO-2015075771 | A | * | 5/2015 | ............... C21D 9/46 |
| WO | WO-2015075771 | A1 | * | 5/2015 | ............. C22C 38/12 |
| WO | 2015194619 | A1 | | 12/2015 | |

OTHER PUBLICATIONS

Japanese Office Action for Japanese Application No. 2017-565525, dated Sep. 18, 2018 with Concise Statement of Relevance of Office Action, 6 pages.
Korean Office Action for Korean Application No. 10-2018-7021846, dated Jun. 24, 2020 with Concise Statement of Relevance of Office Action, 5 pages.
Korean Office Action for Korean Application No. 10-2018-7021846, dated Aug. 26, 2019 with Concise Statement of Relevance of Office Action, 6 pages.
European Communication pursuant to Article 94(3) for European Application No. 17 747 336.0, dated Apr. 1, 2021, 6 pages.
Non Final Office Action for U.S. Appl. No. 13/147,992, dated Dec. 6, 2012, 11 pages.
Non Final Office Action for Application No. 13/147,992, dated Aug. 16, 2013, 14 pages.
Non Final Office Action for Application No. 14/389,039, dated Sep. 7, 2016, 13 pages.
Non Final Office Action for U.S. Appl. No. 16/331,303, dated Oct. 7, 2020, 13 pages.
Final Office Action for U.S. Appl. No. 16/331,303, dated Feb. 17, 2021, 11 pages.

* cited by examiner

STEEL MATERIAL FOR HIGH HEAT INPUT WELDING

CROSS REFERENCE TO RELATED APPLICATIONS

This is the U.S. National Phase application of PCT/JP2017/003080, filed Jan. 30, 2017, which claims priority to Japanese Patent Application No. 2016-018572, filed Feb. 3, 2016, the disclosures of each of these applications being incorporated herein by reference in their entireties for all purposes.

FIELD OF THE INVENTION

The present invention relates to a steel material for high heat input welding having excellent low-temperature toughness of the welded heat affected zone in the case that the steel material is welded by high heat input welding with a heat input of more than 80 kJ/cm. The steel material is suitable as a steel material used in a variety of welded structures, such as low-temperature storage tanks, ships, and buildings.

BACKGROUND OF THE INVENTION

In general, steel materials used in fields of, for example, low-temperature storage tanks, ships, and buildings are formed into a structure of a desired shape by joining using welding. For steel materials used in these structures, it is required that not only the base metal but also the weld zone have excellent toughness from the standpoint of safety. For example, tanks for storing, for instance, liquefied ammonium or liquefied propane gas (LPG) are used at low temperatures equal to or lower than the liquefaction temperature of the gas, that is, around −55° C. Thus, it is required that good toughness be exhibited at such low temperatures. For the welding, the operation is typically performed by small heat input multipass welding. However, from the standpoint of improving operational efficiency, the use of high heat input single pass welding, such as electrogas arc welding, is strongly desired. It is known, however, that, in the case that welding heat input is high, in general, the structure of the welded heat affected zone (HAZ) coarsens, which reduces the toughness of the welding heat affected zone.

There are techniques for improving the low-temperature toughness of a steel for low-temperature storage tanks. Patent Literature 1, for example, discloses a low-yield-ratio high-tensile steel having excellent weldability and low-temperature toughness, which is formed from a steel having a chemical composition containing Nb and in which the state of the martensite-austenite (MA) constituent, in terms of, for example, the fraction and the size, is limited.

Patent Literature 2 discloses a steel plate having excellent weld joint low-temperature toughness. The steel plate has a microstructure composed of ferrite and constituents other than ferrite. The average carbon concentration in the other constituents is not more than four times the carbon concentration in the entire steel plate.

These related art technologies, however, were not designed in consideration of high heat input welding using, for example, a welding heat input of more than 80 kJ/cm, and thus do not achieve sufficient low-temperature toughness of welding heat affected zone in the case of high heat input welding.

Examples of techniques for improving welding heat affected zone toughness in the case of high heat input welding include fine dispersion of TiN to inhibit coarsening of austenite grains and utilization of the behavior of TiN as ferrite transformation nuclei. These are commercially used technologies. In addition, a technique of dispersing Ti oxide is disclosed in Patent Literature 3.

However, related art technologies actively utilizing TiN pose a problem in that, in the welding heat affected zone, which is heated to a temperature range in which TiN is dissolved, the above-described effects of Ti disappear, and further, the structure of the base metal is embrittled by dissolved Ti and dissolved N, which significantly reduces toughness. Furthermore, technologies utilizing Ti oxide, such as disclosed in Patent Literature 3, pose a problem in that fine and uniform dispersion of oxide is difficult.

In contrast, Patent Literature 4, for example, discloses appropriate inclusion of Ca, which is necessary for controlling the morphology of sulfides, to utilize CaS to improve welding heat affected zone toughness in the case of high heat input welding. The disclosed technology utilizes CaS, which crystallizes at lower temperatures compared with oxides. Thus, fine dispersion of CaS can be achieved, which enables fine dispersion of ferrite transformation-nucleation nuclei, such as MnS, TiN, and BN, which precipitate during cooling with CaS serving as nuclei. As a result, the structure of the welding heat affected zone is a fine ferrite-pearlite structure, and thus high toughness is achieved.

PATENT LITERATURE

PTL 1: Japanese Patent No. 4261765
PTL 2: Japanese Patent No. 4637516
PTL 3: Japanese Unexamined Patent Application Publication No. 57-51243
PTL 4: Japanese Patent No. 3546308

SUMMARY OF THE INVENTION

Even with the technology of Patent Literature 4, however, there are sometimes cases in which achievement of sufficient toughness at low temperatures, for example, around −55° C., is impossible. This is because, for steel compositions containing relatively high amounts of alloying elements, welding with a high heat input, namely, a welding heat input of more than 80 kJ/cm, can result in formation of coarse bainite and formation of a hard embrittling constituent referred to as martensite-austenite (MA) constituent, in the structure of the bond.

The present invention has been made in view of the above circumstances and is directed toward providing a steel material for high heat input welding having excellent low-temperature toughness of welding heat affected zone at −55° C. in the case that the steel material is welded by high heat input welding with a heat input of more than 80 kJ/cm. The steel material may be used in low-temperature storage tanks, for example.

The present inventors diligently performed studies to solve the problems described above and found the following.

1. To enable a heat affected zone to exhibit low-temperature toughness at, for example, −55° C. in the case of welding with high heat input welding, it is important to inhibit coarsening of austenite grains in the high temperature range, and further, in the subsequent cooling process, to form grain interior ferrite while inhibiting formation of coarse bainite and to reduce the amount of the martensite-austenite (MA) constituent.

2. As specific policies for composition design, the following are effective. A desired Ti content and N content may be ensured to inhibit coarsening of austenite grains. Neither Nb nor Mo may be added, or Nb and/or Mo may be allowed to be present only as incidental impurities, to inhibit formation of coarse bainite and reduce formation of MA. The contents of Al, N, B, Ca, S, and O may be appropriately controlled to form ferrite in grains.

The present invention has been made based on the above findings and further studies conducted. That is, an exemplary embodiment of the present invention is summarized as described below.

[1] A steel material for high heat input welding, the steel material including, in mass %, C: 0.04 to 0.09%, Si: 0.15 to 0.25%, Mn: 1.40 to 2.00%, P: 0.015% or less, S: 0.0005 to 0.0040%, Al: 0.030 to 0.080%, Ti: 0.005 to 0.023%, B: 0.0003 to 0.0020%, Ca: 0.0005 to 0.0030%, N: 0.0030 to 0.0060%, O: 0.0040% or less, Nb: 0.005% or less, and Mo: 0.005% or less, with a balance of Fe and incidental impurities.

[2] The steel material for high heat input welding according to [1], wherein the steel material further includes, in mass %, at least one selected from Cu: 0.5% or less, Ni: 1.0% or less, and Cr: 0.5% or less.

[3] The steel material for high heat input welding according to [1] or [2], wherein the steel material satisfies formula (1), below.

$$0 < \{(Ca-(0.18+130\times Ca)\times O)/1.25\}/S \leq 0.8 \quad (1)$$

In the formula, Ca, O, and S each represent the content (mass %) of a corresponding element.

[4] The steel material for high heat input welding according to any one of [1] to [3], wherein the steel material further satisfies formula (2), below.

$$1.45 \leq Mn + 0.4 \times (Cu+Ni) + Cr \leq 1.92 \quad (2)$$

In the formula, Mn, Cu, Ni, and Cr each represent the content (mass %) of a corresponding element, and the content of an element not included in the steel material is 0.

[5] The steel material for high heat input welding according to any one of [1] to [4], wherein the steel material further includes, in mass %, at least one selected from V: 0.1% or less, and W: 0.1% or less.

[6] The steel material for high heat input welding according to any one of [1] to [5], wherein the steel material further includes, in mass %, at least one selected from Mg: 0.0005 to 0.0050%, Zr: 0.001 to 0.020%, and REM: 0.001 to 0.020%.

[7] The steel material for high heat input welding according to any one of [1] to [6], wherein, in a case that the steel material is welded by high heat input welding with a welding heat input of 80 to 300 kJ/cm, a heat affected zone, adjacent to a bond, of the steel material has an average grain diameter of 10 μm or less in a prior γ grain.

The present invention makes it possible to obtain, at low cost, a steel material that exhibits excellent heat affected zone strength and low-temperature toughness even in the case that the steel material is welded by high heat input welding of 80 to 300 kJ/cm. Thus, the steel material according to embodiments of the present invention is suitable for use in, for example, low-temperature storage tanks, ships, and high steel structures, which are formed by high heat input welding, such as electrogas arc welding, submerged arc welding, or electroslag welding.

DETAILED DESCRIPTION OF EMBODIMENTS OF THE INVENTION

Embodiments of the present invention will be described below. First, reasons for limiting the chemical composition in embodiments of the present invention will be described. In the present invention, percentages regarding the chemical composition are all mass percentages.

C: 0.04 to 0.09%

C needs to be included in an amount of 0.04% or more in order to achieve necessary strength. However, inclusion of C in an amount of more than 0.09% reduces welding heat affected zone toughness. Thus, the upper limit is 0.09%. It is preferable that the lower limit be 0.045% or more. It is preferable that the upper limit be less than 0.08%.

Si: 0.15 to 0.25%

Si is necessarily included in steel. In order to increase the strength of the steel, Si is added in an amount of 0.15% or more. On the other hand, inclusion of Si in an amount of more than 0.25% results in formation of large amounts of martensite-austenite constituent in the high heat input welded heat affected zone, which reduces toughness. Thus, the upper limit is, 0.25%. The Si content in the steel is preferably not more than 0.22% and more preferably not more than 0.20%.

Mn: 1.40 to 2.00%

Mn is needed in an amount of 1.40% or more in order to ensure the strength of the base metal. Inclusion of Mn in an amount of more than 2.00% reduces weld zone toughness. Thus, Mn is included in an amount ranging from 1.40 to 2.00%. It is preferable that the lower limit be 1.40% or more. It is preferable that the upper limit be 1.60%.

P: 0.015% or Less

P is an impurity that is inevitably present. Inclusion of P in an amount of more than 0.015% reduces the toughness of the base metal and the weld zone. Thus, the upper limit is 0.015%. In order to achieve good toughness, the P content is preferably not more than 0.010% and more preferably not more than 0.007%.

S: 0.0005 to 0.0040%

S is needed in an amount of 0.0005% or more in order to form necessary CaS or MnS. Inclusion of S in an amount of more than 0.0040% reduces the toughness of the base metal. Thus, the S content is in the range of 0.0005 to 0.0040%. It is preferable that the lower limit be 0.0010% or more. It is preferable that the upper limit be 0.0035% or less.

Al: 0.030 to 0.080%

Al is an important element in embodiments of the present invention. Al is needed in an amount of at least 0.010% or more for deoxidation of steel, and in addition, Al reduces dissolved N by forming AlN in the welded heat affected zone and thus contributes to improvement in toughness. Furthermore, AlN that forms in the welded heat affected zone can act as a ferrite nucleation site within the prior γ grain boundaries and thus contributes to refining of the grain diameter, thereby improving toughness. To produce such effects, Al is needed in an amount of 0.030% or more. Inclusion of Al in an amount of more than 0.080%, however, reduces the toughness of the base metal and also reduces the toughness of the welded heat affected zone. Thus, the Al content is in the range of 0.030 to 0.080%. It is preferable that the lower limit be 0.035% or more. It is preferable that the upper limit be 0.070% or less. It is more preferable that the lower limit be 0.040% or more. It is more preferable that the upper limit be 0.065% or less.

Ti: 0.005 to 0.023%

Ti forms TiN and precipitates during solidification, and thus, in the welded heat affected zone, inhibits coarsening of austenite and serves as ferrite transformation nuclei, to contribute to increasing toughness. Inclusion of Ti in an amount of less than 0.005% reduces the effect. Inclusion of Ti in an amount of more than 0.023% causes coarsening of TiN particles, which results in a failure to produce the expected effect. Thus, the Ti content is in the range of 0.005 to 0.023%. It is preferable that the lower limit be 0.008% or more. It is preferable that the upper limit be 0.020% or less.

B: 0.0003 to 0.0020%

B is an element that, in the welding heat affected zone, reduces dissolved N by forming BN and acts as ferrite transformation nuclei. To produce such effects, B needs to be included in an amount of 0.0003% or more. On the other hand, addition of B in an amount of more than 0.0020% unduly increases hardenability, which reduces toughness. Thus, the B content is in the range of 0.0003 to 0.0020%.

Ca: 0.0005 to 0.0030%

Ca is an element that has the effect of improving toughness by forming CaS to chemically immobilize S. To produce such an effect, Ca needs to be included in an amount of at least 0.0005% or more. On the other hand, inclusion of Ca in an amount of more than 0.0030% results in saturation of the effect. Thus, the Ca content is limited to the range of 0.0005% to 0.0030%. It is preferable that the lower limit be 0.0010% or more. It is preferable that the upper limit be 0.0025% or less.

N: 0.0030 to 0.0060%

It is necessary to ensure that N is present in an amount corresponding to the amount of Ti for forming TiN. A content of N of less than 0.0030% results in a failure to obtain TiN in a sufficient amount and consequently a failure to produce effects of, for example, in the welding heat affected zone, inhibiting coarsening of austenite and serving as ferrite transformation nuclei to contribute to increasing toughness. On the other hand, inclusion of N in an amount of more than 0.0060% increases the amount of dissolved N in the region where TiN is dissolved by welding heat input, which significantly reduces toughness. Thus, the N content is in the range of 0.0030 to 0.0060%. It is preferable that the lower limit be 0.0035% or more. It is preferable that the upper limit be 0.0055% or less.

O: 0.0040% or Less

O is necessarily included. However, O precipitates as oxide during solidification. Thus, inclusion of O in an amount of more than 0.0040% reduces the toughness of the base metal and the welded heat affected zone. Thus, the O content is not more than 0.0040%. It is preferable that the O content not be more than 0.0035%.

Nb: 0.005% or Less and Mo: 0.005% or Less

The contents of Nb and Mo need to be strictly limited in embodiments of the present invention, and thus, in this regard, Nb and Mo are important elements. Inclusion of Nb and/or Mo results in formation of a coarse bainite structure within the prior γ grain interior in the welded heat affected zone, which significantly reduces toughness. Thus, the contents of Nb and Mo, which may be inevitably present, are each 0.005% or less. When the contents of Nb and Mo, which may be inevitably present, are each 0.005% or less, the influence on a decrease in welded heat affected zone toughness is low. It is preferable that the contents of Nb and Mo each be 0.003% or less, and it is more preferable that neither Nb nor Mo be added.

In the present invention, at least one selected from Cu, Ni, and Cr may be selectively included, each within the range described below.

Cu: 0.5% or Less

Cu inhibits reduction in the toughness of the base metal and the welded heat affected zone while increasing strength. This effect is produced by including Cu in an amount of 0.10% or more. Inclusion of Cu in an amount of more than 0.5%, however, may result in hot shortness, which may degrade the surface quality of the steel plate. Thus, it is preferable, in the case of adding Cu, that the content not be more than 0.5%. It is more preferable that the content not be more than 0.4%.

Ni: 1.0% or Less

Similarly to Cu, Ni inhibits reduction in the toughness of the base metal and the welded heat affected zone while increasing strength. This effect is produced by including Ni in an amount of 0.10% or more. Inclusion of Ni in an amount of more than 1.0%, however, may result in saturation of the effect. Thus, it is preferable, in the case of adding Ni, that the content not be more than 1.0%.

Cr: 0.5% or Less

Cr is an element effective for increasing the strength of the base metal and the weld joint. This effect is produced by inclusion of Cr in an amount of 0.05% or more. However, addition in excessive amounts may have an adverse effect on toughness. Thus, it is preferable, in the case of adding Cr, that the upper limit be 0.5%.

Furthermore, in the present invention, at least one selected from V and W may be selectively included, each within the range described below, in mass %.

V: 0.1% or Less

V increases the strength and toughness of the base metal and forms VN to serve as ferrite nucleation nuclei. This effect is produced by including V in an amount of 0.02% or more. Inclusion of V in an amount of more than 0.1%, however, may decrease toughness. Thus, it is preferable, in the case of adding V, that the content not be more than 0.1%.

W: 0.1% or Less

W is an element effective for increasing the strength of the base metal. This effect is produced by including W in an amount of 0.02% or more. However, addition in excessive amounts may have an adverse effect on toughness. Thus, it is preferable, in the case of adding W, that the content not be more than 0.1%.

Furthermore, in the present invention, at least one selected from Mg, Zr, and REMs may be included, each within the range described below, in mass %.

Mg: 0.0005 to 0.0050%

Mg is an element that has the effect of improving toughness by being dispersed as oxide. To produce such an effect, it is preferable that Mg be included in an amount of at least 0.0005% or more. Inclusion of Mg in an amount of more than 0.0050%, however, may result in saturation of the effect. Thus, it is preferable, in the case of adding Mg, that the content be 0.0005 to 0.0050%.

Zr: 0.001 to 0.020%

Zr is an element that has the effect of improving toughness by being dispersed as oxide. To produce such an effect, it is preferable that Zr be included in an amount of at least 0.001% or more. Inclusion of Zr in an amount of more than 0.020%, however, may result in saturation of the effect. Thus, it is preferable, in the case of adding Zr, that the content be 0.001 to 0.020%.

REMs: 0.001 to 0.020%

REMs are elements that have the effect of improving toughness by being dispersed as oxide. To produce such an effect, it is preferable that REM be included in an amount of at least 0.001% or more. Inclusion of REM in an amount of more than 0.020%, however, may result in saturation of the effect. Thus, it is preferable, in the case of adding REM, that the content be 0.001 to 0.020%.

The balance, other than the elements described above, is Fe and incidental impurities.

In the present invention, it is preferable that formula (1), below, be satisfied.

$$0<\{(Ca-(0.18+130\times Ca)\times O)/1.25\}/S\leq 0.8 \qquad (1)$$

In the formula, Ca, O, and S each represent the content (mass %) of the corresponding element.

In an embodiment of the present invention, Ca, O, and S are included such that the relationship $0<\{(Ca-(0.18+130\times Ca)\times O)/1.25\}/S\leq 0.8$ is satisfied. As a result, a morphology of a complex sulfide in which MnS is precipitated on CaS is obtained. If the value of $\{(Ca-(0.18+130\times Ca)\times O)/1.25\}/S$ is greater than 0.8, most of S is immobilized by Ca. As a result, precipitation of MnS, which serves as ferrite nucleation nuclei, on CaS does not occur, which results in a failure to ensure sufficient welded heat affected zone toughness. In the case that the value of $\{(Ca-(0.18+130\times Ca)\times O)/1.25\}/S$ is greater than 0, the morphology of a complex sulfide in which MnS is precipitated on CaS is obtained, and as a result, the effect of promoting ferrite transformation is exhibited. Thus, the relationship $0<\{(Ca-(0.18+130\times Ca)\times O)/1.25\}/S\leq 0.8$ is specified. If $\{(Ca-(0.18+130\times Ca)\times O)/1.25\}/S\leq 0$, CaS does not crystallize and thus S precipitates exclusively in the form of MnS, which results in a failure to achieve fine dispersion in the welded heat affected zone.

In the present invention, it is preferable that formula (2), below, be satisfied.

$$1.45\leq Mn+0.4\times(Cu+Ni)+Cr\leq 1.92 \qquad (2)$$

In the formula, Mn, Cu, Ni, and Cr each represent the content (mass %) of the corresponding element, and the content of an element not included in the steel material is 0.

In an embodiment of the present invention, $Mn+0.4\times(Cu+Ni)+Cr$ is 1.45 or more and 1.92 or less. As a result, desired base metal and weld joint strengths and a desired welded heat affected zone toughness are both achieved. If the value is less than 1.45, achievement of a desired strength is impossible. If the value is more than 1.92, welded heat affected zone toughness decreases. It is preferable that the value be 1.50 or more and 1.90 or less.

In the present invention, it is preferable that the structure of the heat affected zone satisfy the following.

In the case that the steel material is welded by high heat input welding with a welded heat input of 80 to 300 kJ/cm, the heat affected zone, adjacent to the bond, has a structure in which an average grain diameter of the prior γ grain interior is less than or equal to 10 μm According to embodiments of the present invention, the heat affected zone, adjacent to the bond, has a structure in which the average grain diameter of the prior γ grain interior is less than or equal to 10 μm in the case that the steel material is welded by high heat input welding with a welding heat input of 80 to 300 kJ/cm. Thus, excellent heat affected zone toughness is achieved. Here, high heat input welding with a welding heat input of 80 to 300 kJ/cm is of concern because such high heat input welding tends to cause coarsening of the microstructure, which tends to result in reduced toughness. Here, the structure of the heat affected zone adjacent to the bond is a region from the boundary between the weld metal and the base steel plate to a location in the base metal steel plate approximately 0.5 mm from the boundary. The average grain diameter of the prior γ grain interior of less than or equal to 10 μm can be achieved by adding neither Nb nor Mo or by allowing Nb and/or Mo to be present only as incidental impurities and by controlling the amounts of addition of Ti, N, Al, B, Ca, S, and O to be within the specified ranges. As a result, the heat affected zone has excellent toughness.

The average grain diameter of the prior γ grain interior can be measured by EBSD (electron beam backscattering diffraction). In the present invention, the average grain diameter is defined as the average of equivalent circular diameters of regions surrounded by boundaries that define crystal misorientations of 15 degrees or more, in the crystal orientation map obtained by EBSD measurement.

The steel material according to exemplary embodiments of the present invention is produced in the following manner, for example. First, molten iron is refined in a converter to produce steel, which is then subjected to RH degassing and thereafter to continuous casting or ingot casting-blooming processing to form a slab. The slab may be reheated and hot-rolled and thereafter be naturally cooled. Instead, after the hot rolling, processes, such as the following, may be performed: accelerated cooling; direct quenching-tempering; reheating and quenching-tempering; or reheating and normalizing-tempering. Thus, production can be accomplished. The production conditions are not particularly specified provided that a desired strength can be achieved. Preferable rolling conditions include the following: reheating temperature, 1050 to 1250° C.; finishing temperature, 700 to 900° C.; average cooling rate after rolling, 1 to 50° C./s; and cooling stop temperature, 400 to 600° C.

Example

Next, the present invention will be described based on examples.

Steelmaking was performed in a 150-kg high-frequency induction melting furnace to obtain steels having compositions shown in Table 1 and the steel was formed into a slab of 200 mm thickness. The slab was heated at 1150° C. for one hour and thereafter hot-rolled at a finishing temperature of 770° C., which was the temperature at the center of the plate thickness, to be finished to a plate thickness of 40 mm. Thereafter, the slab was cooled by accelerated cooling at an average cooling rate of 10° C./s (center portion of the plate thickness) to a temperature of 500 to 550° C. and thereafter naturally cooled.

TABLE 1

| Steel No. | Chemical composition (mass %) | | | | | | | | | | | |
|---|---|---|---|---|---|---|---|---|---|---|---|---|
| | C | Si | Mn | P | S | Al | Ti | B | Ca | N | O | Nb |
| 1 | 0.075 | 0.17 | 1.53 | 0.006 | 0.0020 | 0.064 | 0.012 | 0.0009 | 0.0027 | 0.0036 | 0.0021 | <0.001 |
| 2 | 0.058 | 0.18 | 1.66 | 0.004 | 0.0019 | 0.048 | 0.012 | 0.0009 | 0.0025 | 0.0032 | 0.0015 | <0.001 |
| 3 | 0.049 | 0.19 | 1.53 | 0.002 | 0.0022 | 0.051 | 0.013 | 0.0008 | 0.0021 | 0.0041 | 0.0028 | <0.001 |
| 4 | 0.047 | 0.17 | 1.56 | 0.003 | 0.0011 | 0.053 | 0.012 | 0.0008 | 0.0023 | 0.0044 | 0.0031 | <0.001 |

TABLE 1-continued

| | | | | | | | | | | | | |
|---|---|---|---|---|---|---|---|---|---|---|---|---|
| 5 | 0.057 | 0.17 | 1.53 | 0.005 | 0.0024 | 0.055 | 0.013 | 0.0009 | 0.0020 | 0.0038 | 0.0020 | <0.001 |
| 6 | 0.055 | 0.16 | 1.58 | 0.003 | 0.0021 | 0.049 | 0.012 | 0.0006 | 0.0019 | 0.0042 | 0.0025 | <0.001 |
| 7 | 0.053 | 0.18 | 1.52 | 0.003 | 0.0018 | 0.052 | 0.012 | 0.0009 | 0.0021 | 0.0045 | 0.0028 | <0.001 |
| 8 | 0.052 | 0.19 | 1.55 | 0.002 | 0.0017 | 0.048 | 0.013 | 0.0008 | 0.0021 | 0.0048 | 0.0027 | 0.003 |
| 9 | 0.056 | 0.16 | 1.53 | 0.004 | 0.0019 | 0.051 | 0.014 | 0.0012 | 0.0023 | 0.0051 | 0.0022 | <0.001 |
| 10 | 0.051 | 0.18 | 1.43 | 0.003 | 0.0021 | 0.047 | 0.012 | 0.0009 | 0.0021 | 0.0049 | 0.0023 | <0.001 |
| 11 | 0.048 | 0.20 | 1.51 | 0.004 | 0.0022 | 0.050 | 0.013 | 0.0010 | 0.0019 | 0.0053 | 0.0021 | <0.001 |
| 12 | 0.055 | 0.19 | 1.55 | 0.005 | 0.0023 | 0.053 | 0.012 | 0.0011 | 0.0008 | 0.0045 | 0.0031 | <0.001 |
| 13 | 0.052 | 0.20 | 1.53 | 0.004 | 0.0018 | 0.051 | 0.011 | 0.0010 | 0.0030 | 0.0052 | 0.0015 | <0.001 |
| 14 | 0.061 | 0.18 | 1.51 | 0.003 | 0.0021 | 0.049 | 0.012 | 0.0011 | 0.0020 | 0.0052 | 0.0020 | <0.001 |
| 15 | 0.045 | 0.21 | 1.49 | 0.006 | 0.0019 | 0.053 | 0.013 | 0.0010 | 0.0018 | 0.0049 | 0.0021 | <0.001 |
| 16 | 0.052 | 0.19 | 1.53 | 0.005 | 0.0021 | 0.048 | 0.012 | 0.0009 | 0.0019 | 0.0052 | 0.0022 | <0.001 |
| 17 | 0.048 | 0.23 | 1.48 | 0.003 | 0.0023 | 0.045 | 0.012 | 0.0013 | 0.0023 | 0.0050 | 0.0021 | <0.001 |
| 18 | 0.050 | 0.17 | 1.51 | 0.004 | 0.0018 | 0.041 | 0.012 | 0.0006 | 0.0021 | 0.0048 | 0.0020 | <0.001 |
| 19 | 0.068 | 0.15 | 1.58 | 0.004 | 0.0018 | <u>0.028</u> | 0.013 | 0.0008 | 0.0022 | 0.004 | 0.0022 | <0.001 |
| 20 | 0.065 | 0.16 | 1.55 | 0.005 | 0.0021 | 0.052 | 0.012 | 0.0007 | 0.0023 | <u>0.0028</u> | 0.0012 | <0.001 |
| 21 | 0.051 | <u>0.28</u> | 1.52 | 0.006 | 0.0023 | 0.053 | 0.012 | 0.0008 | 0.0021 | 0.0039 | 0.0019 | <0.001 |
| 22 | 0.065 | 0.22 | 1.50 | 0.004 | 0.0020 | 0.048 | 0.011 | <u>0.0001</u> | 0.0023 | 0.0034 | 0.0022 | <0.001 |
| 23 | 0.050 | 0.20 | 1.54 | 0.003 | 0.0008 | 0.051 | 0.012 | 0.0006 | <u>0.0002</u> | 0.0036 | 0.0019 | <0.001 |
| 24 | 0.048 | 0.23 | <u>1.38</u> | 0.004 | 0.0009 | 0.052 | 0.011 | 0.0008 | 0.0021 | 0.0041 | 0.0021 | <0.001 |
| 25 | 0.052 | 0.18 | <u>2.02</u> | 0.005 | 0.0018 | 0.053 | 0.011 | 0.0007 | 0.0022 | 0.0042 | 0.0021 | <0.001 |
| 26 | 0.048 | 0.19 | 1.52 | 0.006 | 0.0024 | 0.047 | 0.012 | 0.0009 | 0.0013 | 0.0037 | 0.0024 | <u>0.007</u> |
| 27 | 0.048 | 0.20 | 1.57 | 0.002 | 0.0016 | 0.065 | 0.012 | 0.0007 | 0.0021 | 0.0046 | 0.0035 | <u>0.012</u> |
| 28 | 0.052 | 0.21 | 1.54 | 0.004 | 0.0019 | 0.057 | 0.013 | 0.0009 | 0.0018 | 0.0044 | 0.0028 | <0.001 |
| 29 | 0.051 | 0.22 | 1.55 | 0.004 | <u>0.0003</u> | 0.052 | 0.013 | 0.0008 | 0.0019 | 0.0045 | 0.0032 | <0.001 |
| 30 | 0.049 | 0.19 | 1.52 | 0.005 | <u>0.0043</u> | 0.055 | 0.012 | 0.0009 | 0.0017 | 0.0051 | 0.0035 | <0.001 |
| 31 | 0.052 | 0.21 | 1.62 | 0.005 | 0.0021 | <u>0.083</u> | 0.011 | 0.0008 | 0.0020 | 0.0048 | 0.0029 | <0.001 |
| 32 | 0.050 | 0.18 | 1.49 | 0.006 | 0.0022 | 0.055 | <u>0.003</u> | 0.0008 | 0.0018 | 0.0049 | 0.0028 | <0.001 |
| 33 | 0.051 | 0.20 | 1.54 | 0.005 | 0.0019 | 0.052 | <u>0.026</u> | 0.0010 | 0.0021 | 0.0050 | 0.0031 | <0.001 |
| 34 | 0.048 | 0.18 | 1.58 | 0.006 | 0.0020 | 0.049 | 0.013 | <u>0.0022</u> | 0.0019 | 0.0051 | 0.0029 | <0.001 |
| 36 | 0.052 | 0.19 | 1.53 | 0.005 | 0.0021 | 0.048 | 0.015 | 0.0011 | 0.0022 | <u>0.0064</u> | 0.0028 | <0.001 |
| 37 | 0.051 | 0.20 | 1.52 | 0.006 | 0.0022 | 0.050 | 0.012 | 0.0012 | 0.0021 | 0.0050 | <u>0.0045</u> | <0.001 |

| Steel No. | Chemical composition (mass %) | | | | | Formula (1) | Formula (2) | Remarks |
|---|---|---|---|---|---|---|---|---|
| | Mo | Cu | Ni | Cr | others | | | |
| 1 | <0.001 | | | | | 0.63 | 1.53 | Suitable example |
| 2 | <0.001 | | | | | 0.73 | 1.66 | Suitable example |
| 3 | <0.001 | 0.19 | 0.49 | | | 0.30 | 1.80 | Suitable example |
| 4 | <0.001 | 0.21 | 0.50 | 0.08 | | 0.59 | 1.92 | Suitable example |
| 5 | <0.001 | 0.15 | 0.10 | 0.13 | | 0.37 | 1.76 | Suitable example |
| 6 | <0.001 | | | 0.25 | | 0.32 | 1.83 | Suitable example |
| 7 | <0.001 | | 0.55 | | | 0.37 | 1.74 | Suitable example |
| 8 | <0.001 | 0.12 | 0.15 | 0.15 | | 0.41 | 1.81 | Suitable example |
| 9 | 0.004 | 0.22 | 0.40 | | | 0.52 | 1.78 | Suitable example |
| 10 | <0.001 | | | | | 0.40 | 1.43 | Suitable example |
| 11 | <0.001 | 0.25 | 0.55 | 0.15 | | 0.36 | 1.98 | Suitable example |
| 12 | <0.001 | 0.15 | 0.32 | | | −0.03 | 1.74 | Suitable example |
| 13 | <0.001 | 0.12 | 0.52 | | | 0.95 | 1.79 | Suitable example |
| 14 | <0.001 | | 0.12 | 0.10 | 0.02V | 0.43 | 1.66 | Suitable example |
| 15 | <0.001 | 0.10 | 0.21 | | 0.01W | 0.39 | 1.61 | Suitable example |
| 16 | <0.001 | | | 0.23 | 0.0015REM | 0.37 | 1.76 | Suitable example |
| 17 | <0.001 | | 0.22 | 0.15 | 0.0017Mg | 0.45 | 1.72 | Suitable example |
| 18 | <0.001 | | | | 0.0016Zr | 0.53 | 1.51 | Suitable example |
| 19 | <0.001 | | | | | 0.52 | 1.58 | Comparative example |
| 20 | <0.001 | | | | | 0.66 | 1.55 | Comparative example |
| 21 | <0.001 | | 0.21 | 0.15 | | 0.43 | 1.75 | Comparative example |
| 22 | <0.001 | 0.12 | 0.25 | | | 0.50 | 1.65 | Comparative example |
| 23 | <0.001 | 0.20 | 0.51 | | | −0.19 | 1.82 | Comparative example |
| 24 | <0.001 | | | | | 1.02 | 1.38 | Comparative example |
| 25 | <0.001 | | | | | 0.54 | 2.02 | Comparative example |
| 26 | <0.001 | 0.10 | 0.21 | | | 0.15 | 1.64 | Comparative example |
| 27 | <0.001 | 0.13 | 0.50 | | | 0.26 | 1.82 | Comparative example |
| 28 | <u>0.05</u> | 0.14 | 0.48 | | | 0.27 | 1.79 | Comparative example |
| 29 | <0.001 | 0.15 | | | | 1.42 | 1.61 | Comparative example |
| 30 | <0.001 | | 0.12 | | | 0.06 | 1.57 | Comparative example |
| 31 | <0.001 | | | | | 0.28 | 1.62 | Comparative example |
| 32 | <0.001 | 0.11 | | | | 0.23 | 1.53 | Comparative example |
| 33 | <0.001 | | | 0.15 | | 0.29 | 1.69 | Comparative example |
| 34 | <0.001 | | | | | 0.26 | 1.58 | Comparative example |
| 36 | <0.001 | | | 0.21 | | 0.34 | 1.74 | Comparative example |
| 37 | <0.001 | 0.12 | 0.21 | | | 0.02 | 1.65 | Comparative example |

Underlined; comparative example
(1) Formula: (Ca − (0.18 + 130 × Ca) × O)/1.25/S
(2) Formula: Mn + 0.4 × (Cu + Ni) + Cr From the obtained steel plate, a round bar tensile test piece having a parallel portion of φ 14 mm×85 mm and a gauge length of 70 mm was taken in the C direction (direction perpendicular to rolling direction) at a ¼ t position (t: plate thickness), and a 2 mm V-notch Charpy test piece was taken in the L direction (rolling direction) at a ¼ t position. The strength (yield strength YS and tensile strength TS) and the absorbed energy at a test temperature of −55° C. (average of values of three test pieces, referred to as "vE-55° C."), of the base metal, were evaluated. The target properties were as follows: YS≥345 MPa; TS≥485 MPa; and absorbed energy vE-55° C.≥250 J.

Furthermore, to evaluate the properties of the weld joint heat affected zone, joints were prepared by high heat input welding (approximately 200 kJ/cm) using electrogas arc welding (EGW). Subsequently, the strength of the joint was evaluated from a full-thickness JIS 1-type test piece, which was taken in a direction perpendicular to the weld bead. The HAZ toughness was evaluated by using Charpy test pieces having a notch in the bond. The notch was formed in a position 1 mm from the front side or the back side (6 test pieces were taken for each) in the plate thickness direction. The evaluation was based on the absorbed energy at a test temperature of −55° C. (average of values of the twelve test pieces, referred to as "vE-55° C."). The target properties were as follows: joint TS≥485 MPa; and absorbed energy vE-55° C.≥250 J for weld joint HAZ toughness.

The average grain diameter of the prior γ grain interior of the welded heat affected zone was determined as follows. A measurement was performed by using EBSD (electron beam backscattering diffraction), in 400 μm×400 μm field of view. On a crystal orientation map in which only the prior γ grain interior was extracted, boundaries were drawn such that the boundaries define misorientations of 15 degrees or more. The average of the equivalent circular diameters of the regions surrounded by the boundaries was designated as the average grain diameter.

Table 2 shows the average grain diameter of the prior γ grain interior and the HAZ toughness together with the mechanical properties of the base metal.

TABLE 2

| Steel No. | Base metal | | | Weld joint | | Average grain diameter (μm) | Remarks |
| | YS (N/mm$^2$) | TS (N/mm$^2$) | vE-55° C. (J) | Joint TS (N/mm$^2$) | vE-55° C. (J) | | |
| --- | --- | --- | --- | --- | --- | --- | --- |
| 1 | 347 | 493 | 386 | 493 | 252 | 3 | Invention example |
| 2 | 372 | 539 | 385 | 512 | 285 | 2 | Invention example |
| 3 | 406 | 586 | 381 | 525 | 389 | 3 | Invention example |
| 4 | 431 | 625 | 401 | 544 | 326 | 4 | Invention example |
| 5 | 398 | 573 | 406 | 524 | 384 | 3 | Invention example |
| 6 | 411 | 589 | 402 | 531 | 363 | 5 | Invention example |
| 7 | 394 | 564 | 385 | 520 | 354 | 2 | Invention example |
| 8 | 411 | 580 | 388 | 527 | 326 | 6 | Invention example |
| 9 | 400 | 577 | 388 | 523 | 311 | 4 | Invention example |
| 10 | 345 | 485 | 382 | 485 | 256 | 6 | Invention example |
| 11 | 446 | 640 | 397 | 550 | 257 | 8 | Invention example |
| 12 | 389 | 557 | 407 | 519 | 253 | 4 | Invention example |
| 13 | 402 | 573 | 406 | 527 | 259 | 6 | Invention example |
| 14 | 370 | 537 | 381 | 511 | 296 | 2 | Invention example |
| 15 | 360 | 527 | 401 | 505 | 312 | 4 | Invention example |
| 16 | 397 | 569 | 383 | 521 | 368 | 5 | Invention example |
| 17 | 394 | 553 | 410 | 518 | 384 | 4 | Invention example |
| 18 | 345 | 488 | 393 | 491 | 336 | 6 | Invention example |
| 19 | 356 | 514 | 383 | 502 | 51 | 13 | Comparative example |
| 20 | 355 | 502 | 400 | 496 | 53 | 16 | Comparative example |
| 21 | 400 | 570 | 403 | 519 | 189 | 11 | Comparative example |
| 22 | 368 | 538 | 395 | 511 | 222 | 15 | Comparative example |
| 23 | 414 | 593 | 389 | 528 | 248 | 16 | Comparative example |
| 24 | 313 | 445 | 394 | 476 | 252 | 9 | Comparative example |
| 25 | 458 | 656 | 384 | 555 | 188 | 12 | Comparative example |
| 26 | 399 | 533 | 391 | 508 | 58 | 26 | Comparative example |
| 27 | 425 | 594 | 396 | 528 | 41 | 31 | Comparative example |
| 28 | 413 | 575 | 397 | 526 | 66 | 28 | Comparative example |
| 29 | 361 | 525 | 395 | 514 | 87 | 13 | Comparative example |
| 30 | 352 | 518 | 226 | 509 | 56 | 9 | Comparative example |
| 31 | 358 | 522 | 235 | 516 | 126 | 9 | Comparative example |
| 32 | 355 | 519 | 268 | 504 | 46 | 14 | Comparative example |

TABLE 2-continued

| | Base metal | | | Weld joint | | | |
|---|---|---|---|---|---|---|---|
| | | | | | | Average grain | |
| Steel No. | YS (N/mm$^2$) | TS (N/mm$^2$) | vE-55° C. (J) | Joint TS (N/mm$^2$) | vE-55° C. (J) | diameter (μm) | Remarks |
| 33 | 367 | 541 | 253 | 523 | 51 | 12 | Comparative example |
| 34 | 353 | 535 | 284 | 532 | 163 | 10 | Comparative example |
| 36 | 381 | 559 | 267 | 515 | 125 | 8 | Comparative example |
| 37 | 375 | 532 | 238 | 518 | 72 | 9 | Comparative example |

Table 2 demonstrates that, in Invention Examples, Nos. 1 to 18, all the weld joints had high strength, with a tensile strength of 485 MPa or more, and also had excellent welded heat affected zone toughness, with a welded heat affected zone absorbed energy vE-55° C. of 250 J or more. On the other hand, Comparative Examples No. 19 to 28 fell outside the range of embodiments of the present invention, regarding at least one of the following: chemical composition; value of {(Ca−(0.18+130×Ca)×O)/1.25}/S; value of Mn+0.4×(Cu+Ni)+Cr; and average grain diameter of the prior γ grain interior. Comparative Examples No. 19 to 28 were inferior in at least one of the properties mentioned above.

The invention claimed is:

1. A steel material for high heat input welding, the steel material comprising,
a weld joint formed on a base steel material by high heat input welding with a welding heat input of 80 to 300 kJ/cm,
wherein the base steel material comprises, in mass %,
C: 0.04 to 0.09%,
Si: 0.15 to 0.25%,
Mn: 1.40 to 2.00%,
P: 0.015% or less,
S: 0.0005 to 0.0040%,
Al: 0.040 to 0.065%,
Ti: 0.005 to 0.023%,
B: 0.0003 to 0.0020%,
Ca: 0.0005 to 0.0030%,
N: 0.0030 to 0.0060%,
O: 0.0040% or less,
Nb: 0.003% or less, and
Mo: 0.005% or less, the balance being Fe and incidental impurities,
wherein a heat affected zone, adjacent to the weld joint of the steel material has an average grain diameter of 10 μm or less in a prior v grain and an absorbed energy vE$_{-55° C.}$ of 250 J or more.

2. The steel material for high heat input welding according to claim 1, wherein the steel material further comprises in mass %, group A, group B, group C, or combinations thereof,
wherein group A comprises in mass %, at least one of Cu: 0.5% or less, Ni: 1.0% or less, and Cr: 0.5% or less,
wherein group B comprises in mass %, at least one of V: 0.1% or less, and W: 0.1% or less,
wherein group C comprises in mass %, at least one of Mg: 0.0005 to 0.0050%, Zr: 0.001 to 0.020%, and REM: 0.001 to 0.020%.

3. The steel material for high heat input welding according to claim 1, wherein the steel material satisfies formula (1), below $$0<\{(Ca-(0.18+130\times Ca)\times O)/1.25\}/S\leq 0.8 \quad (1)$$

where Ca, O, and S each represent a content in mass % of the corresponding element Ca, O, and S.

4. The steel material for high heat input welding according to claim 2, wherein the steel material satisfies formula (1), below $$0<\{(Ca-(0.18+130\times Ca)\times O)/1.25\}/S\leq 0.8 \quad (1)$$

where Ca, O, and S each represent a content in mass % of the corresponding element, Ca, O, and S.

5. The steel material for high heat input welding according to claim 1, wherein the steel material further satisfies formula (2), below $$1.45\leq Mn+0.4\times(Cu+Ni)+Cr\leq 1.92 \quad (2)$$

where Mn, Cu, Ni, and Cr each represent a content in mass % of the corresponding element Mn, Cu, Ni, and Cr, and a content of an element not included in the steel material is 0.

6. The steel material for high heat input welding according to claim 2, wherein the steel material further satisfies formula (2), below $$1.45\leq Mn+0.4\times(Cu+Ni)+Cr\leq 1.92 \quad (2)$$

where Mn, Cu, Ni, and Cr each represent a content in mass % of the corresponding element Mn, Cu, Ni, and Cr, and a content of an element not included in the steel material is 0.

7. The steel material for high heat input welding according to claim 3, wherein the steel material further satisfies formula (2), below $$1.45\leq Mn+0.4\times(Cu+Ni)+Cr\leq 1.92 \quad (2)$$

where Mn, Cu, Ni, and Cr each represent a content in mass % of the corresponding element Mn, Cu, Ni, and Cr, and a content of an element not included in the steel material is 0.

8. The steel material for high heat input welding according to claim 4, wherein the steel material further satisfies formula (2), below $$1.45\leq Mn+0.4\times(Cu+Ni)+Cr\leq 1.92 \quad (2)$$

where Mn, Cu, Ni, and Cr each represent a content in mass % of the corresponding element Mn, Cu, Ni, and Cr, and a content of an element not included in the steel material is 0.

* * * * *